No. 636,793. Patented Nov. 14, 1899.
C. GLEISES.
PNEUMATIC TIRE.
(Application filed Mar. 9, 1899.)

(No Model.)

Witnesses:
G. S. Noble
J. Buehler

Inventor.
Charles Gleises
by B. Singer
Att'y.

UNITED STATES PATENT OFFICE.

CHARLES GLEISES, OF NANTES, FRANCE.

PNEUMATIC TIRE.

SPECIFICATION forming part of Letters Patent No. 636,793, dated November 14, 1899.

Application filed March 9, 1899. Serial No. 708,401. (No model.)

*To all whom it may concern:*

Be it known that I, CHARLES GLEISES, a citizen of the Republic of France, residing at Nantes, France, have invented certain new and useful Improvements in Armor for Pneumatic Tires, of which the following is a specification.

The object of the present invention is a puncture-proof and explosion-preventing covering for the pneumatic tires of bicycle-wheels or like vehicles.

The drawings annexed show by way of example the invention.

Figure 2:
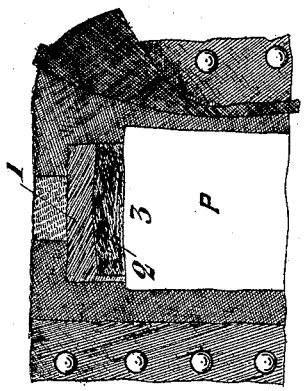
Figure 1:
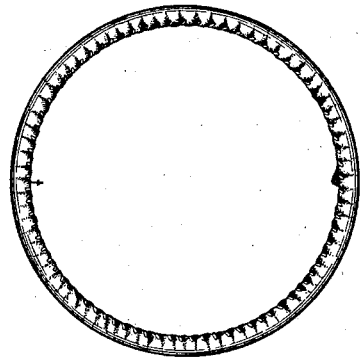

In the drawings, Figure 1 is an elevation of a tire manufactured according to the invention. Fig. 2 is an inside view of a section of the covering which is the subject of my invention.

The outer covering of this armor, the purpose of which is to render pneumatic tires puncture-proof and also non-explosible, is made of a fabric cut on the bias. It forms a perfect shield or envelop, having its edges provided with eyelets, by means of which it can be laced over the air-tube.

The covering is distended by means of the usual inflatable rubber tube, the extremities of which are closed and into which air is pumped in the usual manner through a valve. This tube is on its tread-surface protected by a strip 2, made of hydrophilic wadding which has been coated on both sides with india-rubber or agglutinated by any appropriate chemical process. Said strip is inserted between bands 1 and 3, made of moleskin of suitable thickness and dimension, according to the diameter of the tube and covering with which it is to be used and the weight of the vehicle.

The covering is preferably made waterproof along its running or tread surface, or it may be covered on such surface with an india-rubber band.

The strip 2 may be made of nitrocellulose rendered non-inflammable, and the tissues of which may be artificial silk made according to the Chardonnet process.

Having fully described my invention, what I claim, and desire to secure by Letters Patent, is—

1. A puncture-proof waterproofed covering for pneumatic tires composed of a band of fabric cut on the bias, and having its edges provided with eyelets, a band of wadding placed within the covering, coated with rubber or agglutinated by a suitable chemical process and inserted between two bands of moleskin, substantially as described.

2. A puncture-proof armor for pneumatic tires composed of a band of fabric cut on the bias and having eyelets for lacing, said band forming an envelop for the air-tube, a strip of wadding coated on both sides with rubber or otherwise agglutinated, and bands of moleskin arranged on each side of said wadding, said bands and wadding being interposed between the air-tube and the fabric cover, substantially in the manner and for the purpose set forth.

CHARLES GLEISES.

Witnesses:
S. SECHERIF,
CH. AULEROY.